(12) United States Patent
Lou et al.

(10) Patent No.: US 11,964,694 B2
(45) Date of Patent: Apr. 23, 2024

(54) KART AND FRAME THEREOF

(71) Applicant: Ninebot (Changzhou) Tech Co., Ltd., Jiangsu (CN)

(72) Inventors: Yi Lou, Jiangsu (CN); Dekun Kong, Jiangsu (CN); Tao Jiang, Jiangsu (CN); Ji Lin, Jiangsu (CN)

(73) Assignee: Ninebot (Changzhou) Tech Co. Ltd., Changzhou (CN)

( * ) Notice: Subject to any disclaimer, the term of this patent is extended or adjusted under 35 U.S.C. 154(b) by 551 days.

(21) Appl. No.: 17/226,451

(22) Filed: Apr. 9, 2021

(65) Prior Publication Data

US 2021/0316791 A1  Oct. 14, 2021

(30) Foreign Application Priority Data

Apr. 14, 2020 (CN) .......................... 202020551202.6

(51) Int. Cl.
*B62D 21/14* (2006.01)
*B62D 21/15* (2006.01)
*B62D 21/18* (2006.01)

(52) U.S. Cl.
CPC ............. *B62D 21/14* (2013.01); *B62D 21/15* (2013.01); *B62D 21/183* (2013.01)

(58) Field of Classification Search
CPC ...... B62D 21/14; B62D 21/183; B62D 21/12; B62D 21/18; B62D 21/00; B62D 21/02
See application file for complete search history.

(56) References Cited

U.S. PATENT DOCUMENTS

| | | | | |
|---|---|---|---|---|
| 3,177,962 A | * | 4/1965 | Bailey | B62D 21/183 280/282 |
| 4,397,476 A | * | 8/1983 | Bolyard | B62D 63/061 280/149.2 |
| 4,471,972 A | * | 9/1984 | Young | A61G 5/1051 410/23 |
| 5,042,831 A | * | 8/1991 | Kuhns | B62D 21/14 280/786 |
| 6,793,248 B1 | * | 9/2004 | Sung | B62D 21/183 180/209 |
| 7,628,413 B2 | * | 12/2009 | Gallipoli | A63C 17/01 280/786 |

(Continued)

FOREIGN PATENT DOCUMENTS

| | | | | |
|---|---|---|---|---|
| CN | 110171482 A | * | 8/2019 | ........... B62D 21/183 |
| CN | 110182258 A | * | 8/2019 | ........... B62D 21/183 |
| CN | 213620079 U | * | 7/2021 | |

*Primary Examiner* — Amy R Weisberg
*Assistant Examiner* — Tiffany L Webb
(74) *Attorney, Agent, or Firm* — Frost Brown Todd LLP (57) ABSTRACT

The present disclosure discloses a kart and a frame thereof. The frame includes: a first frame including an outer sleeve and a first fixing piece arranged on the outer sleeve; a second frame including an inner sleeve defined with at least the two first perforations in an axial direction of the inner sleeve, the outer sleeve being fitted over the inner sleeve, one of the first frame and the second frame being a front frame and the other one being a rear frame; a second fixing piece including a rod section and a fitting section, the rod section being connected to a lower portion of the fitting section, the rod section protruding into any one of the first perforations of the inner sleeve from the first fixing piece, and the fitting section being fitted with the first fixing piece.

19 Claims, 5 Drawing Sheets

(56) References Cited

U.S. PATENT DOCUMENTS

| | | | |
|---|---|---|---|
| 9,592,724 B1* | 3/2017 | Trujillo | B62D 21/14 |
| 11,066,105 B2* | 7/2021 | Lutz | B60J 10/86 |
| 2022/0135133 A1* | 5/2022 | Cai | B62D 21/14 |
| | | | 296/26.01 |

* cited by examiner

KART AND FRAME THEREOF

CROSS-REFERENCE TO RELATED APPLICATIONS

This application is based upon and claims priority to Chinese Patent Application Serial No. 202020551202.6, filed on Apr. 14, 2020, the entire content of which is incorporated herein by reference.

TECHNICAL FIELD

The present disclosure relates to a technical field of karts, in particular to a kart and a frame thereof.

BACKGROUND

In a related art, in order to adapt to users with different body shapes, chassis of some karts adopt a telescopic chassis. The telescopic chassis includes a front frame, a rear frame, and a telescopic locking structure. The telescopic locking structure uses a form with a collar fixed on the front frame to tightly cling to the rear frame to achieve the expansion and contraction of the front frame and the rear frame. As such, the locking force of this form can be different from person to person. Person with great strength can lock it tightly and person with little strength may not lock it at all, such that the front frame and the rear frame are suddenly shortened when the kart is driven or collides with another kart, thereby causing serious injury to the driver.

SUMMARY

Embodiments of a first aspect of the present disclosure provides a frame of a kart, which includes a first frame including an outer sleeve and a first fixing piece arranged on the outer sleeve; a second frame including an inner sleeve defined with at least the two first perforations in an axial direction of the inner sleeve, the outer sleeve being fitted over the inner sleeve, one of the first frame and the second frame being a front frame and the other one being a rear frame; a second fixing piece including a rod section and a fitting section, the rod section being connected to a lower portion of the fitting section, the rod section protruding into any one of the first perforations of the inner sleeve from the first fixing piece, and the fitting section being fitted with the first fixing piece.

A kart according to the present disclosure includes the frame of kart described above.

Additional aspects and advantages of the present disclosure will be set forth in part in the following descriptions, and become apparatus in part from the following descriptions, or be learned from the practice of the embodiments of the present disclosure.

BRIEF DESCRIPTION OF THE DRAWINGS

These and other aspects and advantages of embodiments of the present disclosure will become apparent and readily appreciated from the following descriptions made with reference to the drawings, in which.

REFERENCE NUMERALS a kart 1000;

a frame 100;

a first frame 10; an outer sleeve 11; a first fixing piece 12; a second perforation 13; a connecting tube 14; a fourth perforation 15;

a second frame 20; an inner sleeve 21; a first perforation 22; a stud 23;

a second fixing piece 30; a rod section 31; a first rod section 311; a second rod section 312; a guiding end 313; a fitting section 32;

a clearance compensation piece 40; an axial stop piece 50; a pedal cover plate 60; an adsorption piece 70; and a magnet 80.

DETAILED DESCRIPTION

Embodiments of the present disclosure are described in detail below. The embodiments described with reference to the drawings are exemplary, and the embodiments of the present disclosure will be described in detail below.

Referring to FIGS. 1-10, a frame 100 according to an embodiment of the present disclosure applied to a kart 1000 will be described.

Figure 1:
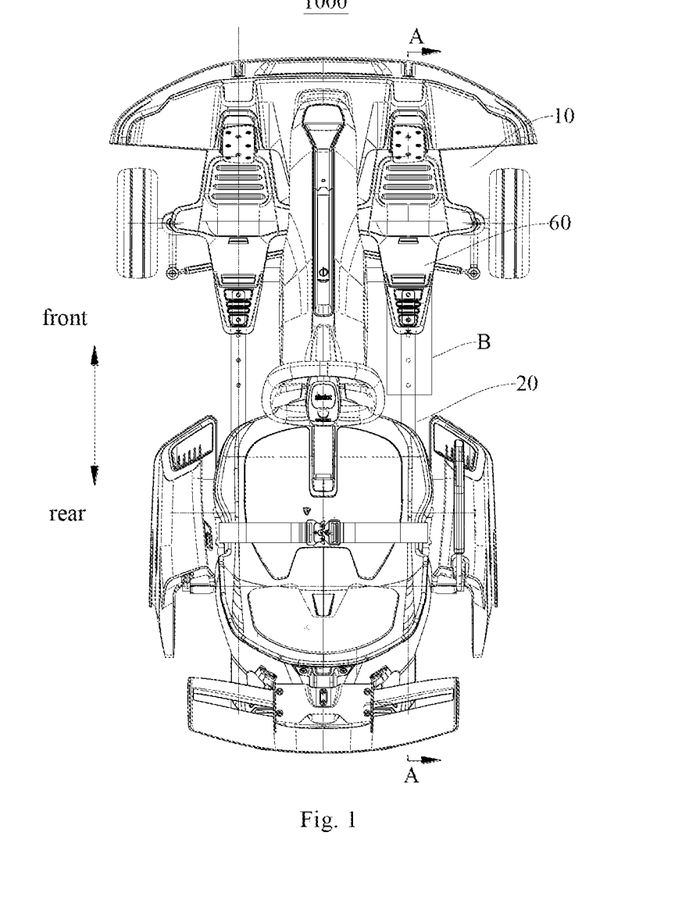
FIG. 1 is a schematic view of a frame of a kart according to an embodiment of the present disclosure.
Figure 2:
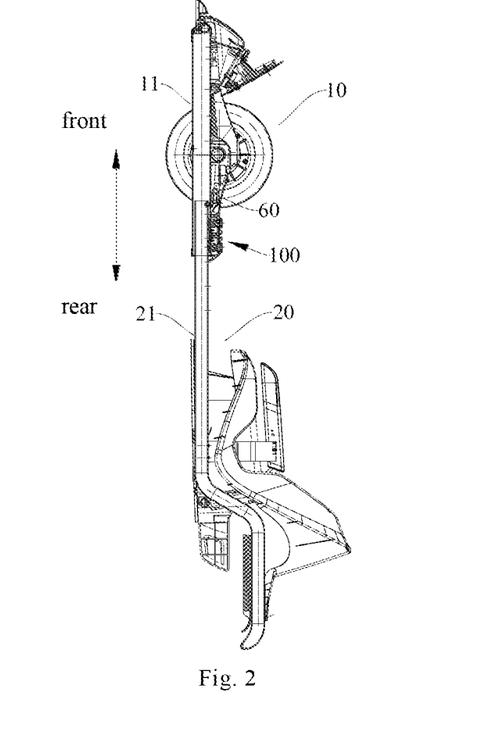
FIG. 2 is a sectional view taken along a direction A-A in FIG. 1.
Figure 3:
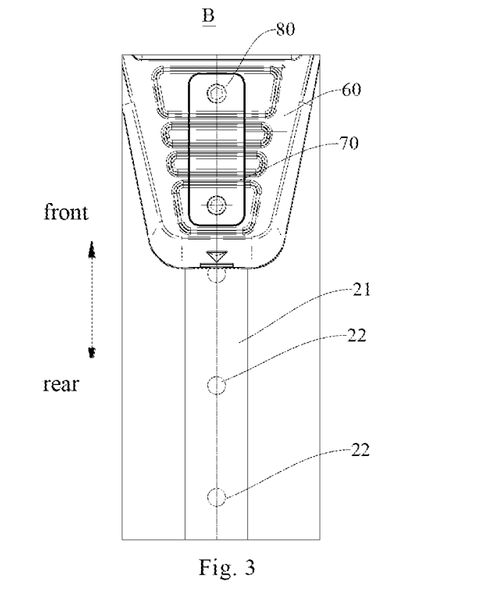
FIG. 3 is an enlarged view of region B in FIG. 1.

As illustrated in FIGS. 1 and 2, the frame 100 of the kart 1000 according to an embodiment of the present disclosure may include: a first frame 10, a second frame 20, and a second fixing piece 30. The second fixing piece 30 is arranged at a joint of the first frame 10 and the second frame 20, and the second fixing piece 30 enables to change a connecting and fitting position of the first frame 10 and the second frame 20, such that the frame 100 of the kart 1000 has a telescopic function and may further be adapted to users with different body shapes.

Figure 4:
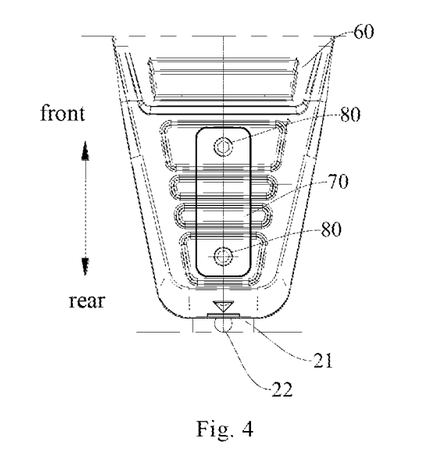
FIG. 4 is a schematic view of a frame of a kart at a pedal cover plate.
Figure 5:
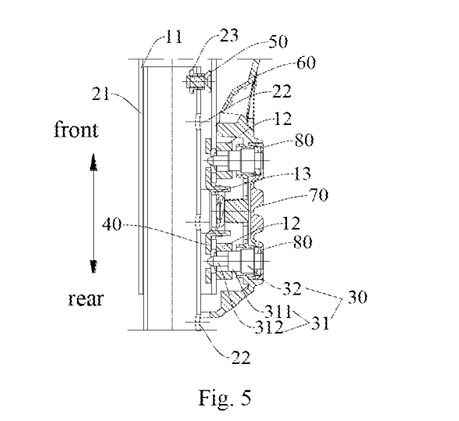
FIG. 5 is a sectional view of a pedal cover plate according to one embodiment of the present disclosure, in which a second fixing piece is not fitted in a first perforation.
Figure 6:
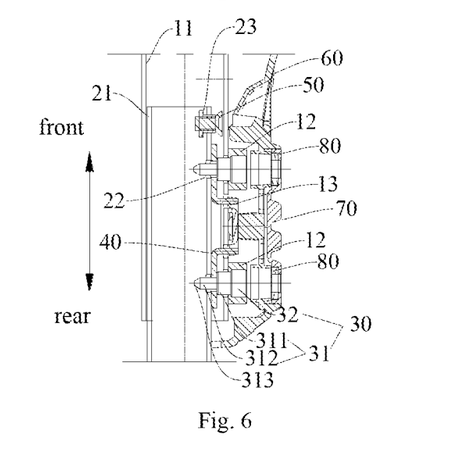
FIG. 6 is a sectional view of a pedal cover plate according to one embodiment of the present disclosure, in which a second fixing piece is fitted in a first perforation.

As illustrated in combination with FIGS. 4-6, the first frame 10 includes an outer sleeve 11 and a first fixing piece 12 arranged on the outer sleeve 11. For example, the first fixing piece 12 may be a nut, the first fixing piece 12 may be welded on the outer sleeve 11, and the outer sleeve 11 is provided with a via hole at a position corresponding to the first fixing piece 12. By adopting the nut, the fixing difficulty of the first fixing piece 12 on the outer sleeve 11 may be reduced, and the nut is simple in structure and easy to arrange.

As illustrated in FIG. 5 and FIG. 6, the second frame 20 includes: an inner sleeve 21 defined with at least the two first perforations 22 in an axial direction of the inner sleeve 21, and the outer sleeve 11 is fitted over the inner sleeve 21. As such, the outer sleeve 11 and the inner sleeve 21 may be fitted over each other such that the distance and positions of the two frames may be conveniently adjusted. One of the first frame 10 and the second frame 20 is a front frame and the other one is a rear frame. It should be noted that the front frame may be the first frame 10 having the outer sleeve 11 or the second frame 20 having the inner sleeve 21. The description will be made below by taking the front frame being the first frame 10 and the rear frame being the second frame 20.

As illustrated in FIGS. 5, 6, 9, and 10, the second fixing piece 30 includes a rod section 31 and a fitting section 32. The rod section 31 is connected to a lower portion of the fitting section 32, the rod section 31 protrudes into any one of the first perforations 22 of the inner sleeve 21 from the first fixing piece 12, and the fitting section 32 is fitted with the first fixing piece 12. It may be understood that after the inner sleeve 21 protrudes into the outer sleeve 11, the inner sleeve 21 is adjusted to an appropriate position such that the appropriate first perforation 22 is directly opposite to the first fixing piece 12, then the rod section 31 of the second fixing piece 30 passes through the first fixing piece 12 and is fitted in the first perforation 22, and the fitting section 32 and the first fixing piece 12 are tightened. The mounting and fixing manner may effectively prevent a relative expansion and contraction between the front frame and the rear frame, and ensure a structural reliability of the frame 100. Moreover, such the mounting and fixing manner may be conveniently adjusted: the relative position of the outer sleeve 11 and the inner sleeve 21 may be readjusted by merely withdrawing the second fixing piece 30 from the first perforation 22 and the first fixing piece 12.

Thus, the frame 100 of the kart 1000 according to the embodiment of the present disclosure, by arranging the second fixing piece 30, may ensure the reliability between the outer sleeve 11 and the inner sleeve 21, and further ensure the structural stability and the security of the frame 100 of the kart 1000. The frame 100 of the kart 1000 may be conveniently adjusted, and the use experience by a user may be improved.

According to one specific embodiment of the present disclosure, as illustrated in FIGS. 4-6, 9, and 10 there are at least two first fixing pieces 12, and the at least two first fixing pieces 12 are spaced apart in an axial direction of the outer sleeve 11, a total number of the first fixing piece 12 is less than that of the first perforations 22. It may be understood that by rationally arranging the number of the first fixing pieces 12, the number of the second fixing piece 30 may be further increased, the connection reliability between the inner sleeve 21 and the outer sleeve 11 may be ensured, such that the stability between the front frame and the rear frame may be ensured, and the user may be effectively protected.

Figure 7:
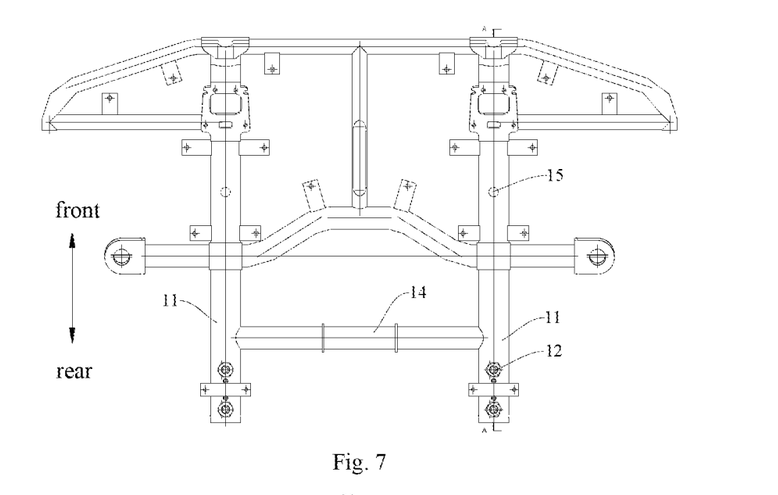
FIG. 7 is a schematic view of a front frame.
Figure 8:
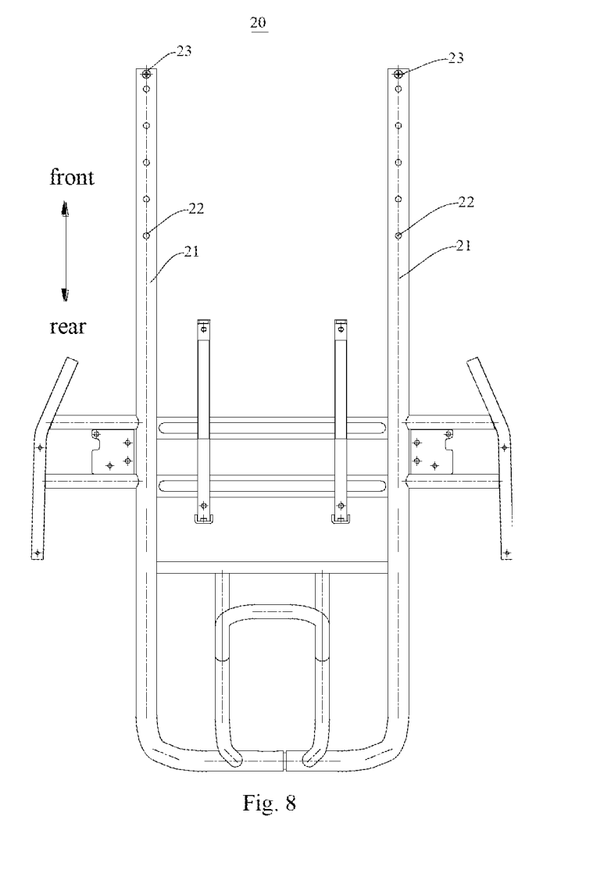
FIG. 8 is a schematic view of a rear frame.

As illustrated in FIGS. 7 and 8, there may be two first fixing pieces 12, two second fixing pieces 30, and five first perforations 22, a distance between the two first fixing pieces 12 is the same as a distance between the two adjacent first perforations 22. Thus, it is convenient for the two first fixing pieces 12 to be fitted with the two corresponding first perforations 22, and a telescopic length between the front frame and the rear frame may be selected in a variety of options.

Specifically, as illustrated in FIGS. 5 and 6, the first perforation 22 may be a circular hole, an inner diameter of the first fixing piece 12 is greater than that of the first perforation 22, an outer diameter of the fitting section 32 is greater than that of the rod section 31, and the inner diameter of the first perforation 22 is greater than or equal to the outer diameter of the rod section 31. Such the arranged second fixing piece 30 may conducive to the rod section 31 passing through the first fixing piece 12 and may facilitate the rod section 31 being fitted in the first perforation 22. The fitting section 32 may be a M12 thread, and the rod section 31 may be a cylinder with 5 mm diameter. The first fixing piece 12 on the front frame is the first fixing piece 12 of M12, and the first perforation 22 on the rear frame is a hole with 8 mm diameter.

According to one alternative embodiment of the present disclosure, as illustrated in FIGS. 5 and 6, the frame 100 of the kart 1000 further includes: a clearance compensation piece 40, an outer diameter of the inner sleeve 21 is less than an inner diameter of the outer sleeve 11, and the clearance compensation piece 40 is arranged between the outer sleeve 11 and the inner sleeve 21. The outer diameter of the inner sleeve 21 of the rear frame may be 28 mm, and the inner diameter of the outer sleeve 11 of the front frame is 34 mm. An clearance between the inner sleeve 21 and the outer sleeve 11 may be compensated by arranging the clearance compensation piece 40, such that a relative shaking between the inner sleeve 21 and the outer sleeve 11 may be avoided, thereby improving the overall stability of the frame and the stability of the frame 100 of the kart 1000. In addition, by arranging the clearance compensation piece 40, the fixing of the second fixing piece 30 is further facilitated at least to some extent.

Further, as illustrated in FIGS. 5 and 6, the outer sleeve 11 is defined with a second perforation 13, a part of the clearance compensation piece 40 protrudes radially out of the outer sleeve 11, and the clearance compensation piece 40 is radially movable with respect to the outer sleeve 11. That is, the clearance compensation piece 40 may be movable radially with respect to the outer sleeve 11, such that the arrangement of the clearance compensation piece 40 on the outer sleeve 11 may be facilitated, and the interference to the process of the inner sleeve 21 protruding into the outer sleeve 11 may also be avoided. In addition, such the arranged clearance compensation piece 40 may be axially restrained by the outer sleeve 11.

Specifically, as illustrated in FIGS. 5 and 6, the clearance compensation piece 40 is defined with a third perforation, and the rod section 31 may be a straight rod section. The rod section 31 includes: a first rod section 311 and a second rod section 312. The first rod section 311 is connected between the fitting section 32 and the second rod section 312, an outer diameter of the first rod section 311 is greater than an inner diameter of the third perforation and an outer diameter of the second rod section 312, the second rod section 312 passes through the third perforation, and an end portion of the second rod section 312 is provided with a guiding end 313. The guiding end 313 is in a frusto-conical shape, so as to facilitate for the second rod section 312 passing through the third perforation. That is, the clearance compensation piece 40 may also be fitted with the second fixing piece 30. After the inner sleeve 21 protrudes into the outer sleeve 11, the second rod section 312 of the second fixing piece 30 may be fitted in the first perforation 22 after passing through the third perforation, and the second rod section 312 may be pressed on the clearance compensation piece 40 to be closely fitted on a surface of the inner sleeve 21, so as to ensure a position of the second rod section 312 between the inner sleeve 21 and the outer sleeve 11, better compensate the clearance between the inner sleeve 21 and the outer sleeve 11, improve the overall stability of the frame, and improve the security of the frame 100 of the kart 1000. The second fixing piece 30 may be an integrally formed second fixing piece 30.

Alternatively, the clearance compensation piece 40 is a sheet metal piece. The sheet metal piece is reliable in structure and easy to place. A thickness of the sheet metal piece may be 2.5 mm. The sheet metal piece with such thickness does not affect the inner sleeve 21 from protruding into the outer sleeve 11, and may also effectively compensate for the clearance between the inner sleeve 21 and the outer sleeve 11.

Further, as illustrated in FIGS. 5 and 6, the frame 100 of the kart 1000 further includes: an axial stop piece 50 arranged at an end portion of the inner sleeve 21, the axial stop piece 50 is able to axially abut against the clearance compensation piece 40 internally and externally. It may be understood that since the axial stop piece 50 is located at the end portion of the inner sleeve 21, and the axial stop piece 50 is located much deeper in the outer sleeve 11 with respect to the second fixing piece 30 and the clearance compensation piece 40, such that the axial stop piece 50 may axially abut against the clearance compensation piece 40 when the second fixing piece 30 is screwed out and the position between the inner sleeve 21 and the outer sleeve 11 is adjusted. Thus, the inner sleeve 21 may be prevented from falling out of the outer sleeve 11, the adjustment difficulty may be reduced, and the reliability of the frame may be improved.

As illustrated in FIGS. 5 and 6, the end portion of the inner sleeve 21 is provided with a stud 23. A radial spacing distance is arranged between the stud 23 and the clearance compensation piece 40, the axial stop piece 50 is a screw fitted on the stud 23, and the outer sleeve 11 is defined with a fourth perforation 15 through which the screw passes. Since the radial spacing distance exists between the stud 23 and the clearance compensation piece 40, when the inner sleeve 21 protrudes into the outer sleeve 11, the clearance compensation piece 40 does not interfer with the inner sleeve 21 and the stud 23. When the stud 23 is directly opposite to the fourth perforation 15, the screw is screwed on the stud 23 through the fourth perforation 15 such that the screw may axially abut against the clearance compensation piece 40 by adjusting a height of the screw, and the inner sleeve 21 may be better prevented from falling out. In addition, the mounting manner is ingenious in design, so as to not interfer with the inner sleeve 21 protruding into the outer sleeve 11, and prevent the inner sleeve 21 from falling out with respect to the outer sleeve 11. The fourth perforation 15 may be a hole with 12 mm diameter, and the screw may be a countersunk screw of M6. A top of the screw is 5 mm higher than a top of the inner sleeve 21 so as to be fitted with the clearance compensation piece 40.

Figure 9:
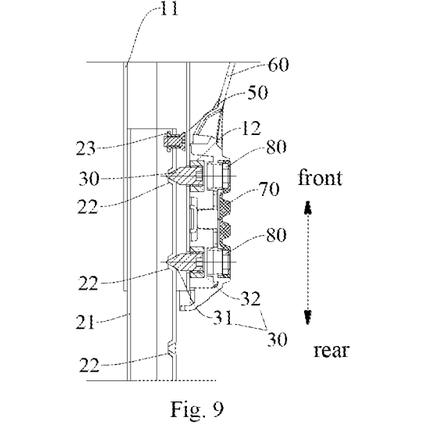
FIG. 9 is a sectional view of a pedal cover plate according to another embodiment of the present disclosure, in which a second fixing piece is not fitted in a first perforation.
Figure 10:
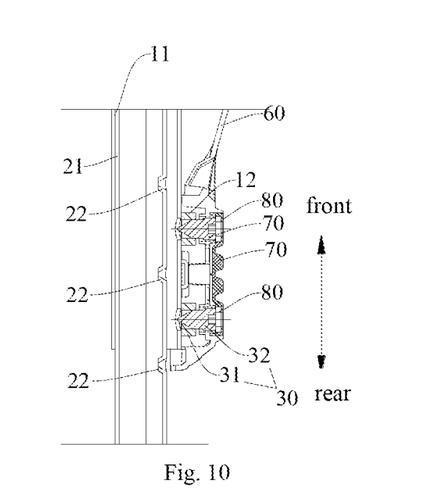
FIG. 10 is a sectional view of a pedal cover plate according to another embodiment of the present disclosure, in which a second fixing piece is fitted in a first perforation.

According to another alternative embodiment of the present invention, as illustrated in FIGS. 9 and 10, unlike the above embodiment illustrated in FIGS. 5 and 6, the first perforation 22 is designed as a tapered hole and the rod section 31 is designed as a tapered rod section. As such, the tapered rod section may protrude into a corresponding tapered hole when the rod section 31 is fitted with the first perforation 22, such that the tapered rod section may be prevented from axially falling out of the tapered hole, the fitting reliability between the inner sleeve 21 and the outer sleeve 11 may be ensured, the tapered rod section 31 may limit the position of the inner sleeve 21 within the outer sleeve 11, the inner sleeve 21 is prevented from shaking, and the reliability of the frame 100 may be ensured. Also, the frame 100 may omit the clearance compensation piece 40 described above.

As illustrated in FIGS. 9 and 10, the inner diameter of the first fixing piece 12 is greater than a maximum inner diameter of the first perforation 22, and an axial length of the rod section 31 is greater than or equal to a depth of the first perforation 22. It may be understood that the maximum inner diameter of the first perforation 22 is an axial end of the first perforation 22 adjacent the first fixing piece 12. Such arrangement enables to facilitate the alignment of the first perforation 22 and the first fixing piece 12. By arranging the length of the rod section 31 to be greater than or equal to the depth of the first perforation 22, the rod section 31 may effectively protrude into the first perforation 22, such that an outer circumferential surface of the rod section 31 may be effectively contacted with an inner circumferential surface of the first perforation 22, and then the inner sleeve 21 and the outer sleeve 11 may be axially stopped, so as to ensure the structural stability of the frame 100. For example, as illustrated in FIG. 9, a top end of the rod section 31 may protrude beyond the first perforation 22 such that the fitting reliability of the two may be further improved.

According to one specific embodiment of the present disclosure, as illustrated in FIGS. 7 and 8, there are two inner sleeves 21 and two outer sleeves 11, and a connecting tube 14 is connected between the two outer sleeves 11. Through the arrangement of the two inner sleeves 21 and the two outer sleeves 11, the front frame and the rear frame may be telescopically adjusted in a stable manner, and the overall reliability of the frame may be further improved. The arrangement of the connecting tube 14 may enhance the structural reliability of the front frame.

As illustrated in FIGS. 3-6, the front frame further includes: a pedal cover plate 60 and an adsorption piece 70, the pedal cover plate 60 is arranged on the outer sleeve 11, the adsorption piece 70 is arranged on the pedal cover plate 60, and a magnet 80 for adsorbing the second fixing piece 30 is arranged in the adsorption piece 70. After the second fixing piece 30 is screwed out of the first fixing piece 12, the magnet 80 may attract the second fixing piece 30 out such that the position of the inner sleeve 21 with respect to the outer sleeve 11 may be adjusted.

Further, the adsorption piece 70 is detachably mounted on the pedal cover plate 60, the magnet 80 is in an annular shape, and an inner circumference of the magnet 80 is an escape hole. It may be understood that the magnet 80 may adsorb the second fixing piece 30 that is screwed out. When the inner sleeve 21 is adjusted to the appropriate position, the second fixing piece 30 needs to be re-screwed into the first fixing piece 12. Firstly, depressing the second fixing piece 30 through the escape hole, then tightly screwing the fitting section 32 with the first fixing piece 12, and once again completing the positioning between the inner sleeve 21 and the outer sleeve 11. The adsorption piece 70 may be a plastic piece. The adsorption piece 70 made of plastic material is reliable in structure and light in weight, which may be conducive to the achievement of the light-weight design target of the all-terrain vehicle 1000.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. indicate the orientation or positional relationship based on the orientation or positional relationship illustrated in the drawings. These terms are merely for convenience of description and simplifying the description, rather than indicating or implying that referred device or element must have a specific orientation, be constructed and operated in a specific orientation, and therefore cannot be understood as a limitation of the present disclosure.

In the description of the present disclosure, "first feature" and "second feature" may include one or more of the features. In the description of the present disclosure, "a plurality" means two or more than two. In the description of the present disclosure, the first feature "above" or "below" the second feature may be that the first feature and second feature are in direct contact, or the first feature and second feature not are in direct contact but in contact by additional features therebetween. In the description of the present disclosure, the first feature being "up", "above" and "on" the second feature may be that the first feature is directly above and obliquely above the second feature, or merely be that the first feature has a level higher than that of the second feature.

Reference throughout this specification to terms "one embodiment", "some embodiments", "exemplary embodiment", "an example", "a specific example", or "some examples", means that a particular feature, structure, material, or characteristic described in connection with the embodiment or example is included in at least one embodiment or example of the present disclosure. In this specification, exemplary descriptions of aforesaid terms are not necessarily referring to the same embodiment or example.

Although embodiments of the present disclosure have been illustrated and described above, it should be understood by those skilled in the art that changes, modifications, alternatives, and variations can be made in the embodiments without departing from spirit, principles and scope of the present disclosure. The scope of this disclosure is limited by the claims and their equivalents.

What is claimed is:

1. A frame of a kart, comprising:
a first frame comprising an outer sleeve and a first fixing piece arranged on the outer sleeve;
a second frame comprising an inner sleeve defined with at least two first perforations in an axial direction of the inner sleeve, the outer sleeve being fitted over the inner sleeve, one of the first frame and the second frame being a front frame and the other one being a rear frame;
a second fixing piece comprising a rod section and a fitting section, the rod section being connected to a lower portion of the fitting section, the rod section protruding into any one of the first perforations of the inner sleeve from the first fixing piece, and the fitting section being fitted with the first fixing piece;
a clearance compensation piece, an outer diameter of the inner sleeve being less than an inner diameter of the outer sleeve, and the clearance compensation piece being arranged between the outer sleeve and the inner sleeve.

2. The frame of the kart according to claim 1, wherein there are at least two first fixing pieces spaced apart in an axial direction of the outer sleeve, a total number of the first fixing pieces is less than a total number of the first perforations.

3. The frame of the kart according to claim 1, wherein the first perforation is a circular hole, an inner diameter of the first fixing piece is greater than an inner diameter of the first perforation, an outer diameter of the fitting section is greater than an outer diameter of the rod section, and the inner diameter of the first perforation is greater than or equal to the outer diameter of the rod section.

4. The frame of the kart according to claim 1, wherein the outer sleeve is defined with a second perforation, a part of the clearance compensation piece protrudes radially out of the outer sleeve, and the clearance compensation piece is radially movable with respect to the outer sleeve.

5. The frame of the kart according to claim 4, further comprising: an axial stop piece arranged at an end portion of the inner sleeve and being able to axially abut against the clearance compensation piece internally and externally.

6. The frame of the kart according to claim 5, wherein the end portion of the inner sleeve is provided with a stud, a radial spacing distance is arranged between the stud and the clearance compensation piece, the axial stop piece is a screw fitted on the stud, and the outer sleeve is defined with a fourth perforation through which the screw passes.

7. The frame of the kart according to claim 4, wherein the clearance compensation piece is defined with a third perforation;
the rod section comprises: a first rod section and a second rod section, the first rod section is connected between the fitting section and the second rod section, an outer diameter of the first rod section is greater than an inner diameter of the third perforation and an outer diameter of the second rod section, and the second rod section passes through the third perforation.

8. The frame of the kart according to claim 7, wherein an end portion of the second rod section is provided with a guiding end, and the guiding end is in a frusto-conical shape.

9. The frame of the kart according to claim 1, wherein the first perforation is a tapered hole, the inner diameter of the first fixing piece is greater than a maximum inner diameter of the first perforation, and an axial length of the rod section is greater than or equal to a depth of the first perforation.

10. The frame of the kart according to claim 1, wherein there are two inner sleeves and two outer sleeves with a connecting tube connected therebetween.

11. The frame of the kart according to claim 1, wherein the first frame is the front frame and the second frame is the rear frame, and the front frame further comprises: a pedal cover plate and an adsorption piece, the pedal cover plate is arranged on the outer sleeve, the adsorption piece is arranged on the pedal cover plate, and a magnet for adsorbing the second fixing piece is arranged in the adsorption piece.

12. The frame of the kart according to claim 11, wherein the adsorption piece is detachably mounted on the pedal cover plate, the magnet is in an annular shape, and an inner circumference of the magnet is an escape hole.

13. The frame of the kart according to claim 11, wherein the adsorption piece is a plastic piece.

14. The frame of the kart according to claim 1, wherein the first fixing piece is a nut and the fitting section is a threaded section.

15. The frame of the kart according to claim 1, wherein the rod section is a straight rod section.

16. The frame of the kart according to claim 1, wherein the clearance compensation piece is a sheet metal piece.

17. The frame of the kart according to claim 1, wherein the first perforation is a tapered hole and the rod section is a tapered rod section.

18. A kart, comprising a frame of the kart,
wherein the frame of kart comprising:
a first frame comprising an outer sleeve and a first fixing piece arranged on the outer sleeve;
a second frame comprising an inner sleeve defined with at least two first perforations in an axial direction of the inner sleeve, the outer sleeve being fitted over the inner sleeve, one of the first frame and the second frame being a front frame and the other one being a rear frame;

a second fixing piece comprising a rod section and a fitting section, the rod section being connected to a lower portion of the fitting section, the rod section protruding into any one of the first perforations of the inner sleeve from the first fixing piece, and the fitting section being fitted with the first fixing piece;

a clearance compensation piece, an outer diameter of the inner sleeve being less than an inner diameter of the outer sleeve, and the clearance compensation piece being arranged between the outer sleeve and the inner sleeve.

19. The kart according to claim 18, wherein there are at least two first fixing pieces spaced apart in an axial direction of the outer sleeve, a total number of the first fixing pieces is less than a total number of the first perforations.

* * * * *